United States Patent
Lee et al.

(10) Patent No.: US 12,432,759 B2
(45) Date of Patent: Sep. 30, 2025

(54) TECHNIQUES TO ALLOCATE RECEIVE RESOURCES

(71) Applicant: QUALCOMM INCORPORATED, San Diego, CA (US)

(72) Inventors: Kuo-Chun Lee, San Diego, CA (US); Arvind Vardarajan Santhanam, San Diego, CA (US); Daniel Amerga, San Diego, CA (US); Danyang Cong, San Diego, CA (US); Xuepan Guan, San Diego, CA (US); Parastoo Kheirkhah, Poway, CA (US); Kushang Desai, San Diego, CA (US); Sarath Kumar Pujari, Hyderabad (IN); Hitesh Jain, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 18/006,697

(22) PCT Filed: Sep. 17, 2021

(86) PCT No.: PCT/US2021/050826
§ 371 (c)(1),
(2) Date: Jan. 24, 2023

(87) PCT Pub. No.: WO2022/066524
PCT Pub. Date: Mar. 31, 2022

(65) Prior Publication Data
US 2023/0269760 A1    Aug. 24, 2023

(30) Foreign Application Priority Data
Sep. 22, 2020  (IN) .............................. 202041040990

(51) Int. Cl.
*H04W 72/51* (2023.01)
*H04L 5/14* (2006.01)
(Continued)

(52) U.S. Cl.
CPC ............... *H04W 72/51* (2023.01); *H04L 5/14* (2013.01); *H04W 72/0457* (2023.01); *H04W 72/23* (2023.01)

(58) Field of Classification Search
CPC . H04W 72/23; H04W 72/51; H04W 72/0457; H04L 5/14
See application file for complete search history.

(56) References Cited

U.S. PATENT DOCUMENTS 9,872,305 B2    1/2018  Moshavi et al.
12,317,296 B2 *  5/2025  Zhang ................... H04W 72/51
(Continued)

FOREIGN PATENT DOCUMENTS

CN    108134659 A    6/2018
CN    109906655 A    6/2019

OTHER PUBLICATIONS

International Search Report and Written Opinion—PCT/US2021/050826—ISA/EPO—Jan. 5, 2022.

*Primary Examiner* — Melanie Jagannathan
(74) *Attorney, Agent, or Firm* — Dalei Dong; Holland & Hart LLP

(57) ABSTRACT

Methods, systems, and devices for wireless communications are described. A user equipment (UE) may transmit, to a base station, a UE capability message associated with a number of downlink multiple-input and multiple-output (MIMO) layers supported at the UE. The UE may receive a configuration for a set of downlink MIMO layers including a first subset of downlink MIMO layers configured for a first cell and a second subset of downlink MIMO layers config- (Continued)

ured for a second cell. The UE may allocate a first set of resources to the first cell or the second cell, or both, based on the first and the second subset of downlink MIMO layers. The UE may determine a second set of resources are unallocated to the set of downlink MIMO layers and allocate the second set of resources to the first cell or the second cell, or both.

30 Claims, 12 Drawing Sheets

(51) Int. Cl.
*H04W 72/0457* (2023.01)
*H04W 72/23* (2023.01)

(56) References Cited

U.S. PATENT DOCUMENTS

| | | | | |
|---|---|---|---|---|
| 2020/0169950 | A1 | 5/2020 | Jung et al. | |
| 2021/0050886 | A1* | 2/2021 | Lee | H04L 5/0094 |
| 2021/0105108 | A1* | 4/2021 | Abdelghaffar | H04L 5/001 |
| 2021/0352580 | A1* | 11/2021 | Zhou | H04W 52/0209 |
| 2022/0132344 | A1* | 4/2022 | Zhou | H04W 24/08 |
| 2022/0182951 | A1* | 6/2022 | Zhou | H04W 52/52 |
| 2022/0287025 | A1* | 9/2022 | Jin | H04W 52/02 |
| 2022/0393740 | A1* | 12/2022 | Nimbalker | H04B 7/0628 |
| 2023/0040302 | A1* | 2/2023 | Zhou | H04B 7/0486 |
| 2023/0246689 | A1* | 8/2023 | Islam | H04W 72/23 |
| | | | | 370/329 |
| 2023/0309089 | A1* | 9/2023 | Kim | H04L 5/0023 |
| 2023/0412460 | A1* | 12/2023 | Van Der Velde | H04W 24/10 |
| 2024/0049007 | A1* | 2/2024 | Zhang | H04W 8/24 |
| 2024/0147471 | A1* | 5/2024 | Islam | H04W 72/51 |
| 2024/0357488 | A1* | 10/2024 | Zhou | H04L 5/0098 |

* cited by examiner

TECHNIQUES TO ALLOCATE RECEIVE RESOURCES

CROSS REFERENCE

The present application is a 371 national stage filing of International PCT Application No. PCT/US2021/050826 by LEE et al. entitled "TECHNIQUES TO ALLOCATE RECEIVE RESOURCES," filed Sep. 17, 2021; and claims the benefit of India Provisional Patent Application No. 202041040990 by LEE et al. entitled "TECHNIQUES TO ALLOCATE RECEIVE RESOURCES," filed Sep. 22, 2020, each of which is assigned to the assignee hereof, and each of which is expressly incorporated by reference in its entirety herein.

FIELD OF TECHNOLOGY

The following relates to wireless communications, including techniques for allocating receive resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate using multiple input, multiple output (MIMO) communications. The UE may be capable for supporting multiple layers of MIMO communications at a time. Techniques for efficiently using UE resources for MIMO communications can be improved.

SUMMARY

The described techniques relate to improved methods, systems, devices, and apparatuses that support techniques to allocate receive resources. Generally, the described techniques provide for improving data throughput by allocating unused resources. A wireless communications system may support multiple input, multiple output (MIMO) communications, where devices communicate using multiple transmit antennas and multiple receive antennas to increase data throughput. A user equipment (UE) may support a number of MIMO processing chains, referred to as resources or receive resources, based on a UE capability. A base station may configure the UE with a number of MIMO layers based on the number of MIMO layers supported by the UE. The UE may allocate receive resources to the cells with configured downlink MIMO layers to process the signaling of the downlink MIMO layers. In some cases, the UE may be configured with fewer downlink MIMO layers than the UE can support, such that the UE may have unused receive resources after allocating receive resources to the cells. A UE described herein may implement techniques to allocate unused resources to one or more cells configured with downlink MIMO layers to improve data rates.

A method for wireless communications at a UE is described. The method may include transmitting, to a base station, a UE capability message associated with a number of downlink MIMO layers supported at the UE, receiving, from the base station, a configuration for a set of downlink MIMO layers based on the UE capability message, the configuration including at least a first subset of the number of downlink MIMO layers configured for a first cell and a second subset of the number of downlink MIMO layers configured for a second cell, allocating a first set of resources to the first cell or the second cell, or both, based on the first subset and the second subset of the number of downlink MIMO layers, determining a second set of resources are unallocated to the set of downlink MIMO layers, and allocating, based on a determination that the second set of resources are unallocated, the second set of resources to the first cell or the second cell, or any combination thereof.

An apparatus for wireless communications at a UE is described. The apparatus may include a processor, memory in electronic communication with the processor, and instructions stored in the memory. The instructions may be executable by the processor to cause the apparatus to transmit, to a base station, a UE capability message associated with a number of downlink MIMO layers supported at the UE, receive, from the base station, a configuration for a set of downlink MIMO layers based on the UE capability message, the configuration including at least a first subset of the number of downlink MIMO layers configured for a first cell and a second subset of the number of downlink MIMO layers configured for a second cell, allocate a first set of resources to the first cell or the second cell, or both, based on the first subset and the second subset of the number of downlink MIMO layers, determine a second set of resources are unallocated to the set of downlink MIMO layers, and allocate, based on a determination that the second set of resources are unallocated, the second set of resources to the first cell or the second cell, or any combination thereof.

Another apparatus for wireless communications at a UE is described. The apparatus may include means for transmitting, to a base station, a UE capability message associated with a number of downlink MIMO layers supported at the UE, means for receiving, from the base station, a configuration for a set of downlink MIMO layers based on the UE capability message, the configuration including at least a first subset of the number of downlink MIMO layers configured for a first cell and a second subset of the number of downlink MIMO layers configured for a second cell, means for allocating a first set of resources to the first cell or the second cell, or both, based on the first subset and the second subset of the number of downlink MIMO layers, means for determining a second set of resources are unallocated to the set of downlink MIMO layers, and means for allocating, based on a determination that the second set of resources are unallocated, the second set of resources to the first cell or the second cell, or any combination thereof.

A non-transitory computer-readable medium storing code for wireless communications at a UE is described. The code may include instructions executable by a processor to transmit, to a base station, a UE capability message associated with a number of downlink MIMO layers supported at the UE, receive, from the base station, a configuration for a set of downlink MIMO layers based on the UE capability message, the configuration including at least a first subset of the number of downlink MIMO layers configured for a first cell and a second subset of the number of downlink MIMO layers configured for a second cell, allocate a first set of resources to the first cell or the second cell, or both, based on the first subset and the second subset of the number of downlink MIMO layers, determine a second set of resources are unallocated to the set of downlink MIMO layers, and allocate, based on a determination that the second set of resources are unallocated, the second set of resources to the first cell or the second cell, or any combination thereof.

In some examples of the method, apparatuses, and non-transitory computer-readable medium described herein, allocating the second set of resources may include operations, features, means, or instructions for allocating the second set of resources based on respective frequency bandwidths for the first cell and the second cell, respective downlink bandwidth ratios for the first cell and the second cell, or respective numbers of resources allocated to the first cell and the second cell, or any combination thereof.

Some examples of the method, apparatuses, and non-transitory computer-readable medium described herein may further include operations, features, means, or instructions for determining a first downlink bandwidth ratio for the first cell and a second downlink bandwidth ratio for the second cell, where the second set of resources may be allocated based on the first downlink bandwidth ratio and the second downlink bandwidth ratio.

In some examples of the method, apparatuses, and non-transitory computer-readable medium described herein, the first downlink bandwidth ratio and the second downlink bandwidth ratio may be based on whether the first cell and the second cell may be configured for frequency division duplexing or time division duplexing.

In some examples of the method, apparatuses, and non-transitory computer-readable medium described herein, the first downlink bandwidth ratio may be determined based on a frame configuration for the first cell, where the first cell may be configured for time division duplexing.

Some examples of the method, apparatuses, and non-transitory computer-readable medium described herein may further include operations, features, means, or instructions for receiving, from the base station, an indication of the frame configuration for the first cell.

In some examples of the method, apparatuses, and non-transitory computer-readable medium described herein, the first downlink bandwidth ratio may be determined based on a special subframe configuration for the first cell.

In some examples of the method, apparatuses, and non-transitory computer-readable medium described herein, the second downlink bandwidth ratio may be determined based on a number of downlink symbols per downlink slot and a number of downlink slots per uplink-downlink periodicity for the second cell, where the second cell may be configured for time division duplexing.

Some examples of the method, apparatuses, and non-transitory computer-readable medium described herein may further include operations, features, means, or instructions for receiving, from the base station, an indication of the number of downlink symbols per downlink slot and the number of downlink slots per uplink-downlink periodicity for the second cell.

Some examples of the method, apparatuses, and non-transitory computer-readable medium described herein may further include operations, features, means, or instructions for determining a first gain for the first cell and a second gain for the second cell, and allocating the second set of resources based on a higher gain of the first gain or the second gain.

In some examples of the method, apparatuses, and non-transitory computer-readable medium described herein, the first gain may be based on a first downlink bandwidth of the first cell and a first downlink bandwidth ratio of the first cell, and the second gain may be based on a second downlink bandwidth of the second cell and a second downlink bandwidth ratio of the second cell.

Some examples of the method, apparatuses, and non-transitory computer-readable medium described herein may further include operations, features, means, or instructions for determining a first reference signal measurement for the first cell and a second reference signal measurement for the second cell, where allocating the second set of resources may be based on the first reference signal measurement and the second reference signal measurement.

In some examples of the method, apparatuses, and non-transitory computer-readable medium described herein, the first reference signal measurement and the second reference signal measurement may be based on respective reference signal received power measurements, reference signal received quality measurements, or both.

In some examples of the method, apparatuses, and non-transitory computer-readable medium described herein, the first cell may be a New Radio cell of a dual connectivity configuration, and the second cell may be a Long Term Evolution cell of the dual connectivity configuration.

Some examples of the method, apparatuses, and non-transitory computer-readable medium described herein may further include operations, features, means, or instructions for determining a first efficiency value based on allocating the second set of resources to the first cell, determining a second efficiency value based on allocating the second set of resources to the second cell, and comparing the first efficiency value to the second efficiency value, where the second set of resources may be allocated based on the comparing.

Some examples of the method, apparatuses, and non-transitory computer-readable medium described herein may further include operations, features, means, or instructions for applying a monotonically increasing function to the first efficiency value and the second efficiency value, where the comparing may be based on applying the monotonically increasing function.

Some examples of the method, apparatuses, and non-transitory computer-readable medium described herein may further include operations, features, means, or instructions for receiving a request from the base station to transmit the UE capability message associated with the number of downlink MIMO layers supported at the UE, where the UE capability message may be transmitted based on receiving the request.

Some examples of the method, apparatuses, and non-transitory computer-readable medium described herein may further include operations, features, means, or instructions for determining a maximum number of resources, where the maximum number of resources corresponds to the first set of resources and the second set of resources.

DETAILED DESCRIPTION

Some wireless communications systems support multiple input, multiple output (MIMO) communications, where devices communicate using multiple transmit antennas and multiple receive antennas to increase data throughput. Each independent data stream between a transmitter and a receiver may be referred to as a layer. A user equipment (UE) may support up to a number of MIMO processing chains, referred to as resources or receive resources, based on a UE capability. A base station may configure the UE with a number of MIMO layers in different radio access technologies (RATs), cells, or component carriers based on the maximum number of MIMO layers supported by the UE. The UE may allocate receive resources to the cells with configured downlink MIMO layers to process the signaling of the downlink MIMO layers. In some cases, the UE may be configured with fewer downlink MIMO layers than the UE can support, such that the UE may have unused receive resources after allocating receive resources to the cells. The unused receive resources may be inefficient for the UE, reducing a possible data throughput.

A UE described herein may implement techniques to allocate unused resources to one or more cells configured with downlink MIMO layers to improve data rates. After a UE allocates resources to one or more serving cells for downlink MIMO layers, the UE may determine whether there are any remaining, or leftover, receive resources which have not been allocated. The UE may then assign the remaining receive resources to one of the serving cells to increase data throughput. In some cases, the UE may identify which serving cell, or serving cells, may provide a highest throughput if assigned the unused receive resources. For example, the UE may determine to allocate the receive resources based on a bandwidth of the frequency carrier of a serving cell, an effective downlink bandwidth ratio of the serving cell, a number of receive resources already allocated to the serving cell, or any combination thereof. The UE may utilize a function to determine scores for different serving cells, and the UE may allocate the remaining receive resources to the serving cell with the highest score.

Aspects of the disclosure are initially described in the context of wireless communications systems. Aspects of the disclosure are further illustrated by and described with reference to apparatus diagrams, system diagrams, and flowcharts that relate to techniques to allocate receive resources.

Figure 1:
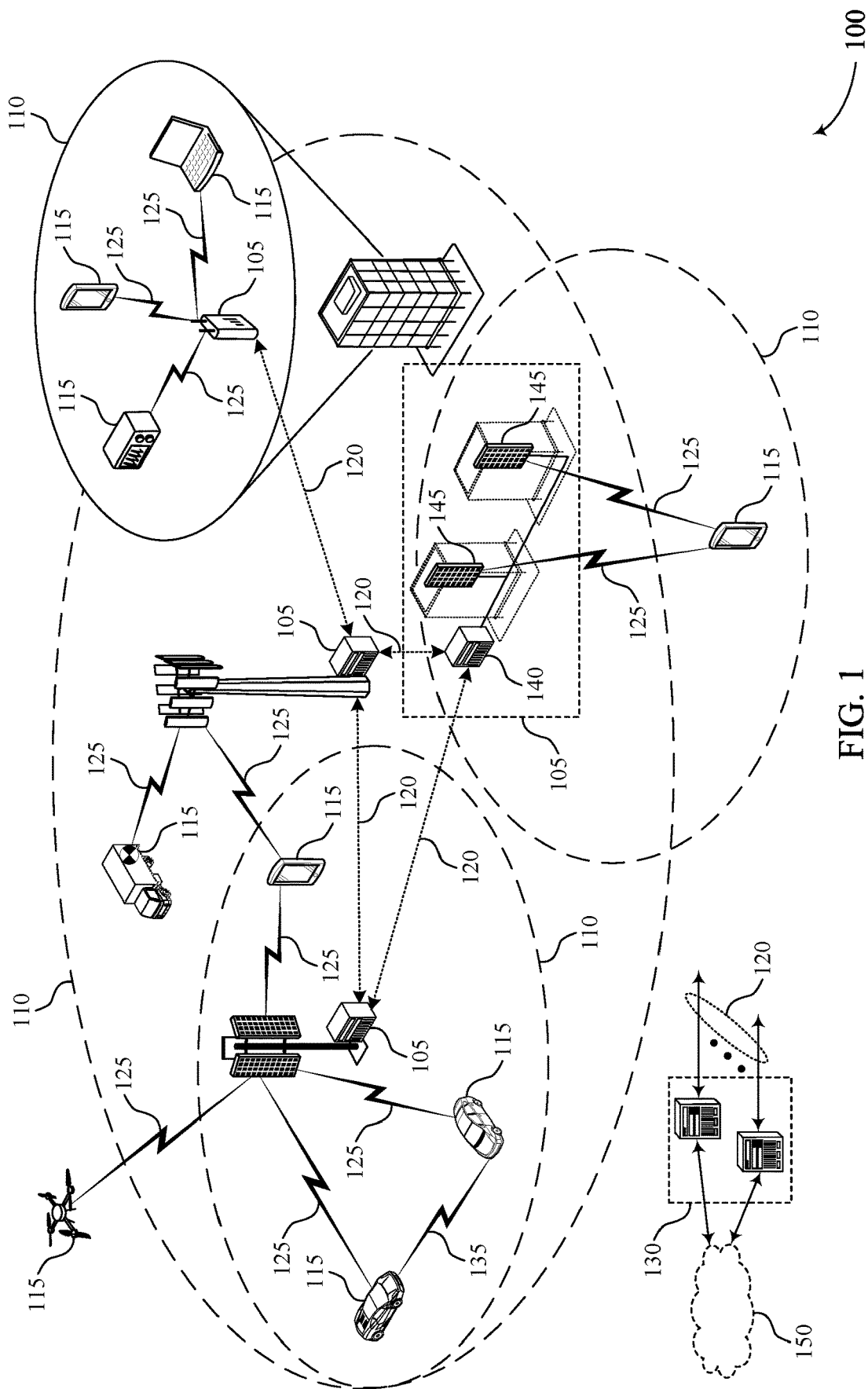
FIG. 1 illustrates an example of a system for wireless communications that supports techniques to allocate receive resources in accordance with aspects of the present disclosure.

FIG. 1 illustrates an example of a wireless communications system 100 that supports techniques to allocate receive resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

The wireless communications system 100 may support MIMO communications. A UE 115 may support a number of MIMO processing chains, which may be referred to as resources or receive resources, based on a UE capability. A base station 105 may configure the UE 115 with a number of MIMO layers based on the number of MIMO layers supported by the UE 115. The UE 115 may allocate receive resources to the cells with configured downlink MIMO layers to process the signaling of the downlink MIMO layers. In some cases, the UE 115 may be configured with fewer downlink MIMO layers than the UE 115 can support, such that the UE 115 may have unused receive resources after allocating receive resources to the cells. A UE 115 described herein may implement techniques to allocate unused resources to one or more cells configured with downlink MIMO layers to improve data rates.

Figure 2:
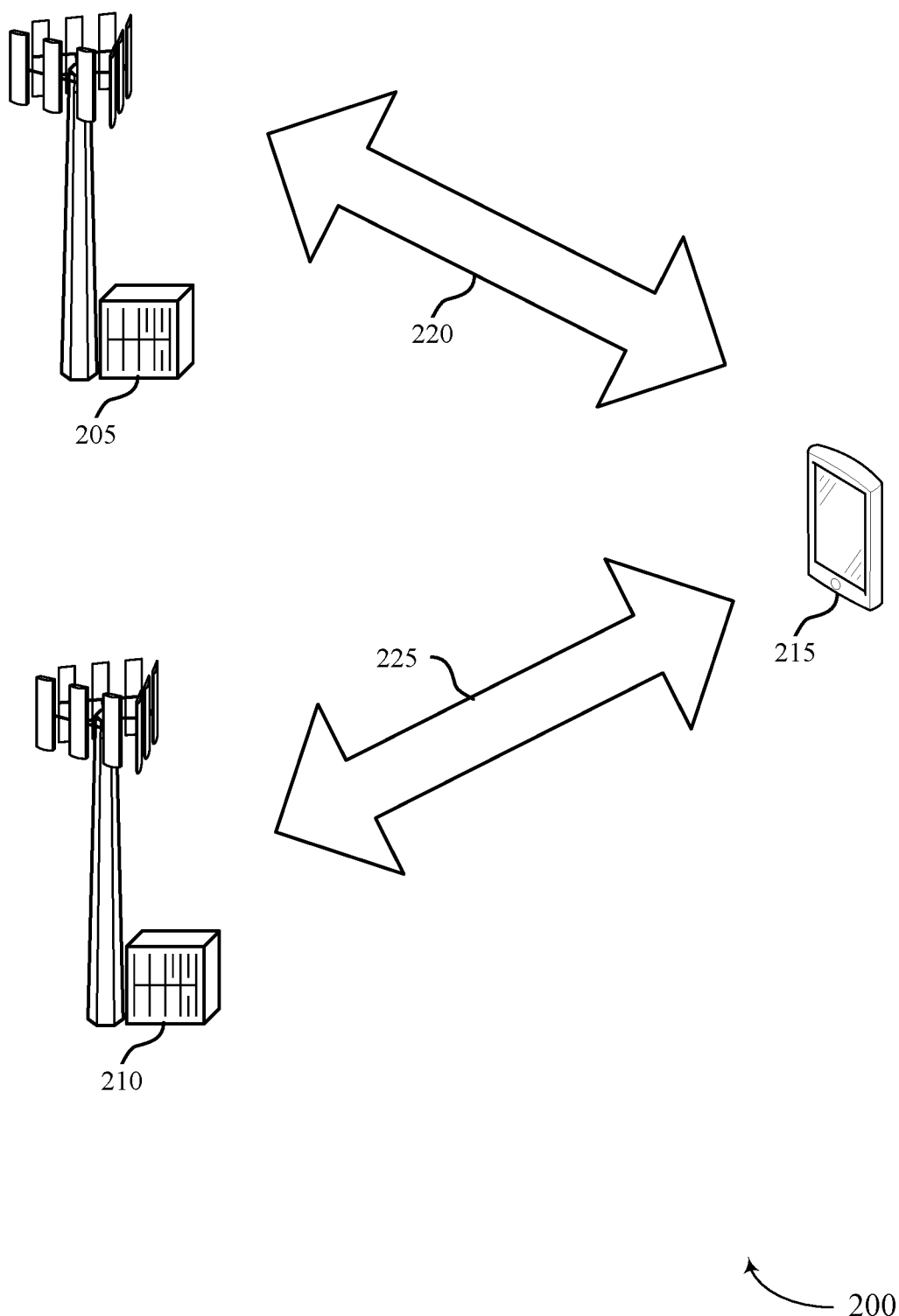
FIG. 2 illustrates an example of a wireless communications system that supports techniques to allocate receive resources in accordance with aspects of the present disclosure.

FIG. 2 illustrates an example of a wireless communications system 200 that supports techniques to allocate receive resources in accordance with aspects of the present disclosure. In some examples, the wireless communications system 200 may implement aspects of wireless communications system 100. The wireless communications system 200 may include UE 215, which may be an example of a UE 115 as described with reference to FIG. 1. The wireless communications system 200 may include base station 205 and base station 210, which may each be an example of a base station 105 described with reference to FIG. 1.

In some examples, the wireless communications system 200 may implement a dual connectivity scheme. In a dual connectivity scheme, the UE 215 may have a first connection to a first RAT, such as NR, and a second connection to a second RAT, such as LTE. For example, the base station 205 may provide a link 220 for NR communications, and the base station 210 may provide a link 225 for LTE communications. Additionally, or alternatively, a single base station 105 (e.g., the base station 205 or the base station 210) may provide links for both LTE and NR communications.

In some cases, the UE 215 may be configured with multiple cells for a single RAT. For example, the base station 205 may provide a first cell, or a first component carrier, for NR and a second cell, or a second component carrier, for NR. In some cases, the first cell and the second cell for NR may be at different frequencies and may each provide a communications link for NR communications via the base station 205.

The wireless communications system 200 may support MIMO communications. For example, the UE 215 and at least the base station 205 may communicate with each other using multiple transmit and receive antennas. There may be different data streams for sending information using the multiple antennas. In some cases, each data stream may be referred to as a MIMO layer, where the number of MIMO layers for MIMO communications may be based on the number of transmit and receive antennas, and therefore the number of data streams, used for the MIMO communications.

The UE 215 may indicate a UE capability corresponding to a number of supported MIMO layers. For example, the UE 215 may transmit a message indicating a UE capability associated a maximum number of MIMO layers supported by the UE 215 for MIMO communications. In some cases, the UE capability may be different, or specific, to certain RATs or component carriers.

The UE 215 may be configured with MIMO layers for MIMO communications for one or more of the RATs. In some cases, the network may configure the UE 215 with a number of MIMO layers based on the UE capability. A cell providing the first RAT (e.g., NR) may allocate up to a maximum number of MIMO layers in a physical downlink shared channel configuration of each serving cell configuration. A cell providing the second RAT (e.g., LTE) may allocate up to a maximum number of MIMO layers in an information element (e.g., an "antennaInfoDedicated" information element) on a per-UE basis. The MIMO layer configuration may apply in a standalone implementation of NR (e.g., with or without carrier aggregation), NR dual connectivity, or EUTRA-NR dual connectivity (e.g., 4G-5G dual connectivity).

The UE 215 may receive the MIMO configuration and allocate at least as many receive resources for each serving cell of RATs or component carriers by the network. A resource, or a receive resource, may correspond to a processing chain or a UE processing component or capability. For example, the UE 215 may be configured with six downlink MIMO layers, and the UE 215 may allocate six or more receive resources to process the downlink signaling of the downlink MIMO layers.

The UE 215 may have some unused receive resources after allocating to the downlink MIMO layers. For example, the UE 215 may be configured with six downlink MIMO layers, but the UE 215 may support up to eight downlink MIMO layers, or the UE 215 may have eight receive resources available. After allocating the receive resources to the downlink MIMO layers, the UE 215 may have two unused receive resources.

The wireless communications system 200 may support techniques to improve data throughput by allocating unused resources. For example, the UE 215 may assign the unused receive resources among the different RATs, cells, or component carriers, to improve throughput for the MIMO communications.

In some cases, the UE 215 may determine to assign the resources to a serving cell based on which assignment improves data throughput. For example, the UE 215 may determine scores, or values, for various configurations based on assigning the unused resources to certain serving cell. The score of each configuration may be the total score of each serving cell. The UE may compare the scores for the different configuration and allocate the unused resources based on the configuration with the highest score. A high score may correspond to an increase in data throughput or reliability or a decrease in latency or communications failures.

The UE 215 may determine the assignment of the unused resources based on a bandwidth of a frequency carrier for the serving cells, an effective downlink bandwidth ratio for the serving cells, a number of receive resources allocated to the serving cells, or any combination thereof. In some cases, a score for a configuration may be determined based on a bandwidth of the frequency carrier for a serving cell, an effective downlink bandwidth ratio, and a number of receive resources allocated for the serving cell. For example, the score for each configuration, k, may be determined based on Equation (1), where j corresponds to the serving cells. In some cases, the UE 215 may determine the allocation of resources which provides a highest score.

$$\text{Score}(k) = \Sigma_j \text{Num\_Rx}(j,k) * \text{BW}(j) * \text{DL\_Ratio}(j) \quad (1)$$

In some cases, the allocation of the unused resources may be based on a downlink bandwidth ratio of a cell. In some cases, the downlink bandwidth ratio of a cell may be based on whether the cell is configured for time division duplexing or frequency division duplexing. Additionally, or alternatively, the downlink bandwidth ratio of a cell may be based on a RAT of the cell (e.g., LTE or NR). In some cases, for a cell configured for FDD, the downlink bandwidth ratio may be 1, or 100%. For example, LTE FDD and NR FDD may each have a downlink bandwidth ratio of 1, or 100%.

For TDD cells, the downlink bandwidth ratio may be smaller than 1 or 100%, as some symbols or slots may not be configured for downlink signaling. For LTE TDD, the downlink bandwidth ratio may be based on an uplink-downlink configuration, a special subframe configuration, or both. For example, the UE 215 may be configured with an uplink-downlink configuration for the second RAT (e.g., LTE) with six downlink subframes, two uplink subframe, and one special subframe per radio frame (e.g., uplink-downlink configuration 2). In some cases, the downlink bandwidth ratio for the LTE TDD cell may be 0.6, for six downlink subframes per radio slot. In some cases, a special subframe configuration for this LTE TDD configuration may be considered. For example, if LTE TDD configuration has uplink-downlink configuration 2 and special subframe configuration 0, the downlink bandwidth ratio may be 0.643.

For NR TDD, the downlink bandwidth ratio may be based on a configured number of downlink slots or downlink symbols per uplink-downlink periodicity. For example, within a downlink-uplink transmission periodicity, a certain number of slots or symbols may be used for downlink signaling, and a certain number of slots or symbols may be used for uplink signaling. In some cases, the UE 215 may receive an indication of the uplink-downlink periodicity configuration, including a transmission periodicity, a number of downlink slots, a number of downlink symbols, a number of uplink slots, a number of uplink symbols, or any combination thereof. In some cases, NR TDD may use a downlink bandwidth ratio of a fixed value, such as 0.75 or 75%. For example, a typical downlink to uplink traffic ratio may be three to one, or three downlink symbols out of four total symbols, which may correspond to a downlink bandwidth ratio of 75%.

Based on the downlink bandwidth ratios for the different cells, the UE 215 may determine an allocation for the remaining receive resources. In this example, the UE 215 may be configured with an LTE TDD cell (e.g., a first cell) of 20 MHz with a downlink bandwidth ration of 0.6, an NR FDD cell (e.g., a second cell) of 50 MHz, and an NR TDD cell (e.g., a third cell) of 100 MHz with a downlink bandwidth ratio of 0.75, where the UE 215 is configured for LTE-NR dual connectivity with one downlink LTE cell and two downlink NR cells. Each cell may have two receive resources already allocated, and the UE 215 may have two remaining, or unallocated, receive resources. In a first configuration (e.g., k=1), the unused resources may be assigned to the first cell. Using Equation (1), the UE 215 may determine a first score of 298 for the first configuration. For example, using Equation (1), 4*20*0.6+2*50*1+2*100*0.75=298 for the first equation. In a second configuration (e.g., k=2), the unused resources may be assigned to the second cell. Using Equation (1), the UE 215 may determine a second score of 374 for the second configuration. For example, using Equation (1), 2*20*0.6+4*50*1+2*100*0.75=374 for the second configuration. In a third configuration (e.g., k=3), the unused resources may be assigned to the third cell. Using Equation (1), the UE 215 may determine a third score of 424 for the third configuration. For example, using Equation (1), 2*20*0.6+2*50*1+4*100*0.75=424 for the third configuration. Therefore, the third configuration may have the highest score, and the UE 215 may allocate the unused resources to the third cell.

In some cases, the UE 215 may assign the unused resources to a frequency carrier cell with a highest gain. In some cases, the UE 215 may assign unused resources (e.g., one at a time) to frequency serving cells until all of the unused resources have been assigned. A frequency carrier or serving cell, j, may have a gain which is equal to the bandwidth of the frequency carrier times the downlink bandwidth ratio of the frequency carrier, as shown by Equation (2).

$$\text{Gain}(j) = \text{BW}(j) * \text{DL\_Ratio}(j) \quad (2)$$

In some cases, the gain may be prioritize when assigning unused resources. For example, the larger the gain of a frequency carrier, the higher the priority for assigning the unused resources. The UE 215 may assign unused resources to serving cells (e.g., according to the UE capability) with the highest gain until the UE 215 has assigned all unused resources.

In an example, the UE 215 may be configured with three cells. A first cell (e.g., j=1) may be configured for LTE TDD with 20 MHz bandwidth and an uplink-downlink configuration with a downlink bandwidth ratio of 0.6. A second cell (e.g., j=2) may be configured for NR FDD with 50 MHz bandwidth. A third cell (e.g., j=3) may be configured for NR TDD with a downlink bandwidth of 0.75. Using Equation (2), a first gain for the first cell may be 12, a second gain for the second cell may be 50, and a third gain for the third cell may be 75. The third cell may have the largest gain, so the UE 215 may assign the unused resources to the third cell. In some cases, the third cell may have the highest priority for assigning the unused resources based on having the highest gain.

In some cases, the UE 215 may allocate the unused resources based on reference signal measurements for the cells. For example, the UE 215 may determine a reference signal measurement of each RAT, component carrier, or serving cell and allocate based on the reference signal measurements. In some cases, channel characteristics, which may be indicated by reference signal measurements, may affect data speed. A reference signal received power (RSRP) measurement or a reference signal received quality (RSRQ) measurement, or both, may be an example of the reference signal measurement. The reference signal measurements may be applied to Equation (1) to determine a score or Equation (2) to determine a gain. For example, the reference signal measurement may be used to determine a score as shown by Equation (3) or to determine a gain as shown by Equation (4).

$$\text{Score}(k) = \Sigma_j f(\text{RSRP}/\text{RSRQ}) * \text{Num\_Rx}(j,k) * BCD * \text{DL\_Ratio}(j) \quad (3)$$

$$\text{Gain}(j) = f(\text{RSRP}/\text{RSRQ}) * BCD * \text{DL\_Ratio}(j) \quad (4)$$

In some cases, the UE 215 may apply a monotonically increasing function of RSRP or RSRQ, or both. For example, $f(\text{RSRP}/\text{RSRQ})$ may be an example of a monotonically increasing function of RSRP measurement results or RSRQ measurement results, or both. The monotonically increasing function may indicate a data rate as a function of the RSRP or RSRQ measurements results.

In some cases, the determined gain or score as a function of a number of receive resources or additional number of receive resources may be linear. The UE 215 may use a score or gain equation as a monotonically increasing function. For example, the UE 215 may apply a monotonically increasing non-linear function to Num_Rx(j, k) when determining a score or a gain for a configuration or cell.

Using the described techniques, the UE 215 may identify a cell, RAT, or component carrier for allocating the unused resources. The UE 215 may then assign any unused resources to the identified cell, RAT, or component carrier. Assigning the unused resources may improve a data rate for the MIMO communications. For example, using the additional resources may improve a data processing or data throughput for the assigned cell, RAT, or component carrier. The UE 215 may assign unused resources to the same cell or different cells. In some cases, the UE 215 may use different determinations (e.g., determining score, determining gain, applying the monotonically increasing function or not, etc.) for different unused resources. These techniques may be applied for LTE-NR, LTE carrier aggregation, NR carrier aggregation, NR-NR dual connectivity where there are multiple frequencies or LTE cells, standalone NR, LTE-NR dual connectivity, or any combination thereof.

Figure 3:
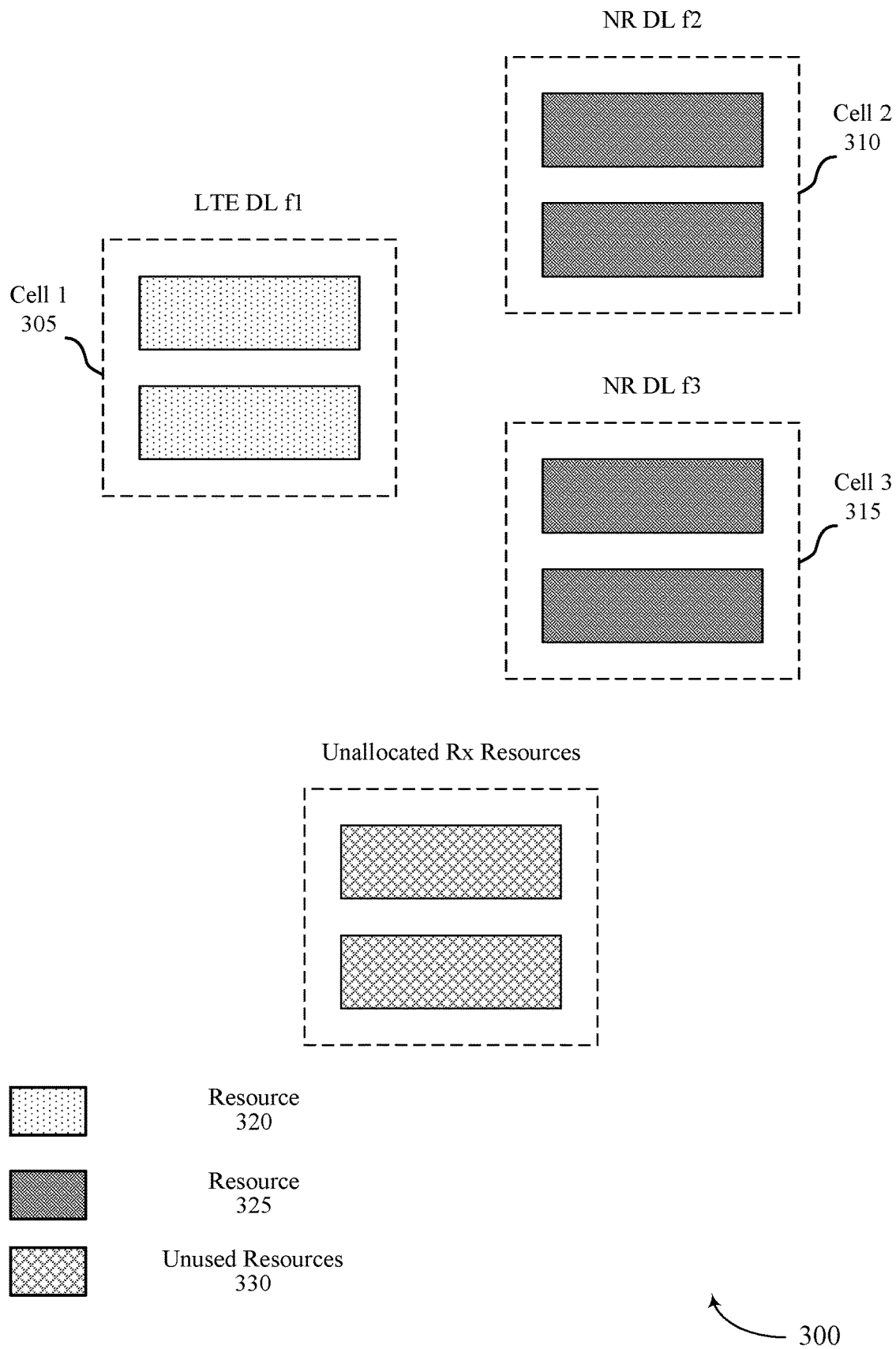
FIG. 3 illustrates an example of a resource allocation scheme that supports techniques to allocate receive resources in accordance with aspects of the present disclosure.

FIG. 3 illustrates an example of a resource assignment 300 that supports techniques to allocate receive resources in accordance with aspects of the present disclosure. In some examples, the resource assignment 300 may implement aspects of wireless communications system 100.

As described with reference to FIG. 2, a UE 115 may send a message indicating a UE capability for MIMO communications to a serving cell. In some cases, the UE 115 may indicate a number of downlink MIMO layers supported by the UE 115 for MIMO communications. The UE 115 may receive a downlink MIMO configuration from a serving cell, which may be provided by a base station 105. For example, the UE 115 may be served by three cells. A first cell may provide LTE communications at a first frequency (e.g., f1). A second cell may provide NR communications at a second frequency (e.g., f2), and a third cell may provide NR communications at a third frequency (e.g., f3). The first cell, the second cell, and the third cell may each be configured with two downlink MIMO layers.

The UE 115 may allocate resources to the cells for the downlink MIMO layers. For example, the UE 115 may allocate two resources to each of the first cell, the second cell, and the third cell. For example, the UE 115 may allocate resources 320 to the first cell 305 and resources 325 to the second cell 310 and third cell 315. Therefore, the UE 115 may have allocated six resources to the first cell 305, the second cell 310, and the third cell 315. However, the UE 115 may be capable of supporting up to eight receive resources. Therefore, the UE 115 may have two unused resources 330. The UE 115 may implement techniques as described by FIG. 2 to determine how to allocate the unused resources.

Figure 4:
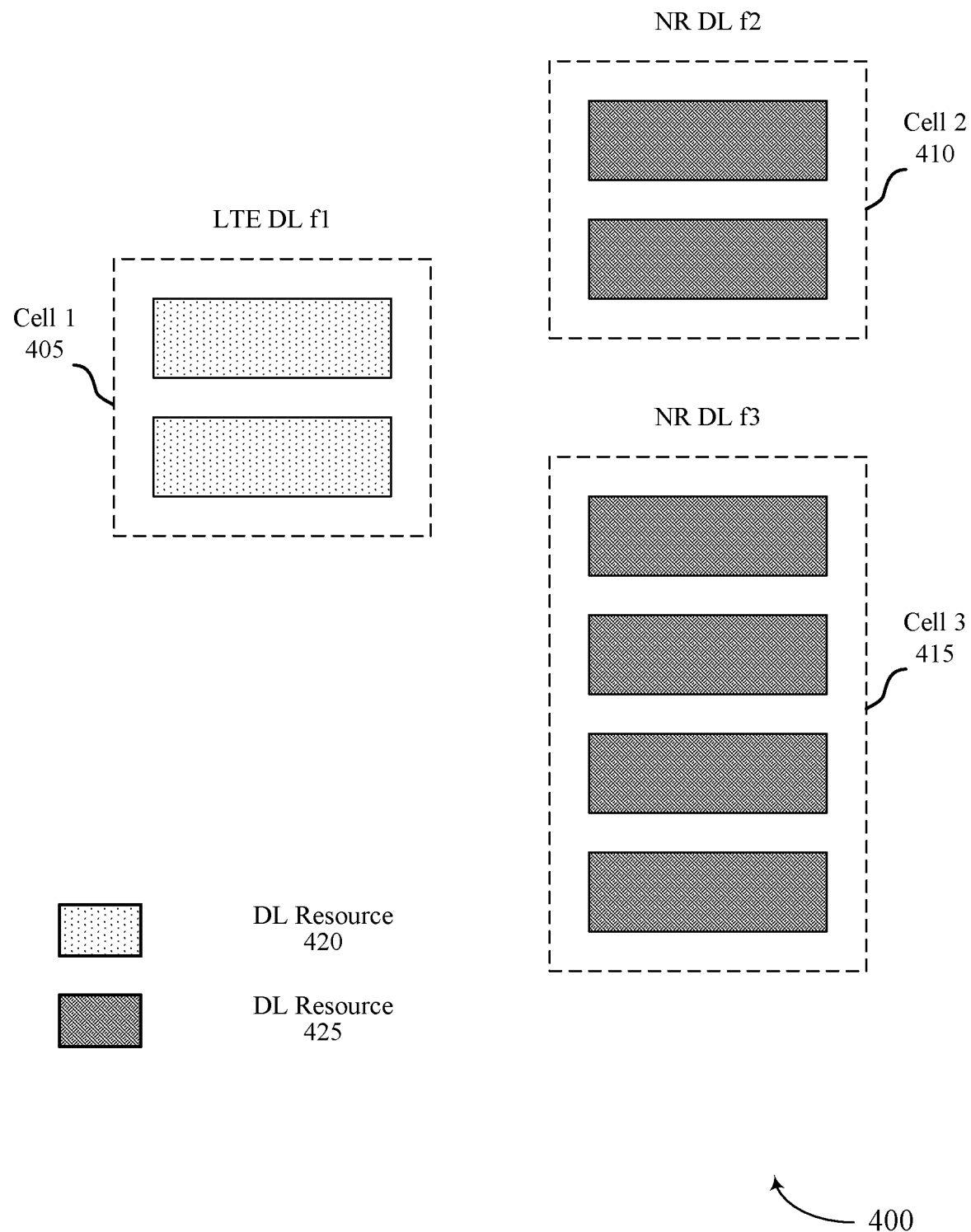
FIG. 4 illustrates an example of an enhanced resource allocation scheme that supports techniques to allocate receive resources in accordance with aspects of the present disclosure.

FIG. 4 illustrates an example of a resource assignment 400 that supports techniques to allocate receive resources in accordance with aspects of the present disclosure. In some examples, the resource assignment 400 may implement aspects of wireless communications system 100.

As shown with reference to FIG. 3, a UE 115 may allocate resources to cells with downlink MIMO layers and still have some unused or unallocated resources. The UE 115 may implement techniques to determine a cell which may provide improved data throughput or conditions if allocated the unused resources. The resource assignment 400 shows an example of a resource assignment after assigning the unused resources.

For example, the UE 115 may determine to allocate the unused resources to the third cell 415. Therefore, the UE 115 may allocate the resources 420 to the first cell 405 and the resources 425 to the second cell 410 and the third cell 415. In this example, the second cell 410 may be allocated two receive resources, and the third cell may be allocated four receive resources. The third cell 415 may have two resources from an initial allocation and an additional two resources from the UE 115 assigning any remaining resources. In this example, the UE 115 may use all eight resources, which may improve data throughput (e.g., for at least the third cell 415) compared to using just six resources per an initial assignment. In some other examples, the unused resources may be assigned to different cells. For example, one unused resource may be assigned to the first cell 405, and another unused resource may be assigned to the third cell 415.

Figure 5:
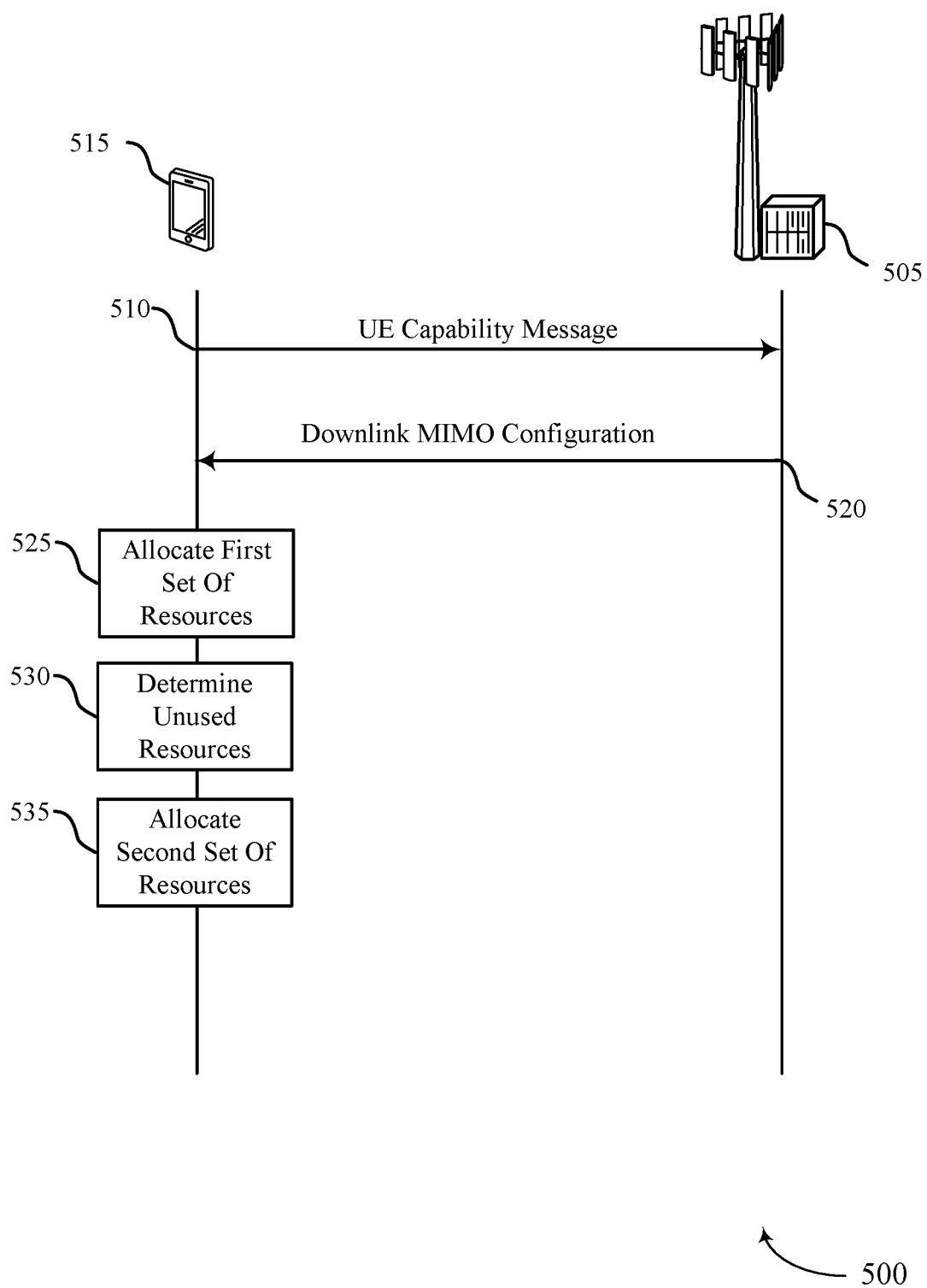
FIG. 5 illustrates an example of a process flow that supports techniques to allocate receive resources in accordance with aspects of the present disclosure.

FIG. 5 illustrates an example of a process flow 500 that supports techniques to allocate receive resources in accordance with aspects of the present disclosure. In some examples, the process flow 500 may implement aspects of wireless communications system 100. The process flow 500 may be implemented by a base station 505 and a UE 515, or both, which may be respective examples of a UE 115 and a base station 105 described with reference to FIG. 1.

At 510, the UE 515 may transmit, to the base station 505, a UE capability message associated with a number of downlink MIMO layers supported at the UE 515.

At 520, the UE 515 may receive, from the base station 505, a configuration for a set of downlink MIMO layers based on the UE capability message. The configuration may include at least a first subset of the number of downlink MIMO layers configured for a first cell and a second subset of the number of downlink MIMO layers configured for a second cell. For example, the first cell may be an NR cell (e.g., of a dual connectivity configuration), and the second cell may be an LTE cell (e.g., of the dual connectivity configuration).

At 525, the UE 515 may allocate a first set of resources to the first cell or the second cell, or both, based on the first subset and the second subset of the number of downlink MIMO layers. For example, the UE 515 may allocate one resource (e.g., one receive resource) for each downlink MIMO layer configured for the first cell and the second cell.

At 530, the UE 515 may determine a second set of resources are unallocated to the set of downlink MIMO layers. For example, after allocating the first set of resources, the UE 515 may determine some resources (e.g., the second set of resources) at the UE 515 are unused or unallocated. To improve data throughput for one or more cells, the UE 515 may allocate the second set of resources to one or more of the cells.

At 535, the UE 515 may allocate, based on the determination that the second set of resources are unallocated, the second set of resources to the first cell or the second cell, or any combination thereof. For example, the UE 515 may allocate the second set of resources to the second cell to improve data rates for the second cell. In some cases, the UE 515 may improve data processing by allocating the unused resources or otherwise improve data throughput. the UE 515 may determine which one or more cells, component carriers, or RATs, to allocate the unused resources to based on techniques described with reference to FIG. 2. For example, the UE 515 may allocate the second set of resources based on respective frequency bandwidths for the first cell and the second cell, respective downlink bandwidth ratios for the first cell and the second cell, or respective numbers of resources allocated to the first cell and the second cell, or any combination thereof. In some cases, the allocation may be based on gains of the first cell and the second cell. Additionally, or alternatively, the UE 515 may allocate the second set of resources based on applying a monotonically increasing function to scores or gains determined for the first cell or the second cell.

Figure 6:
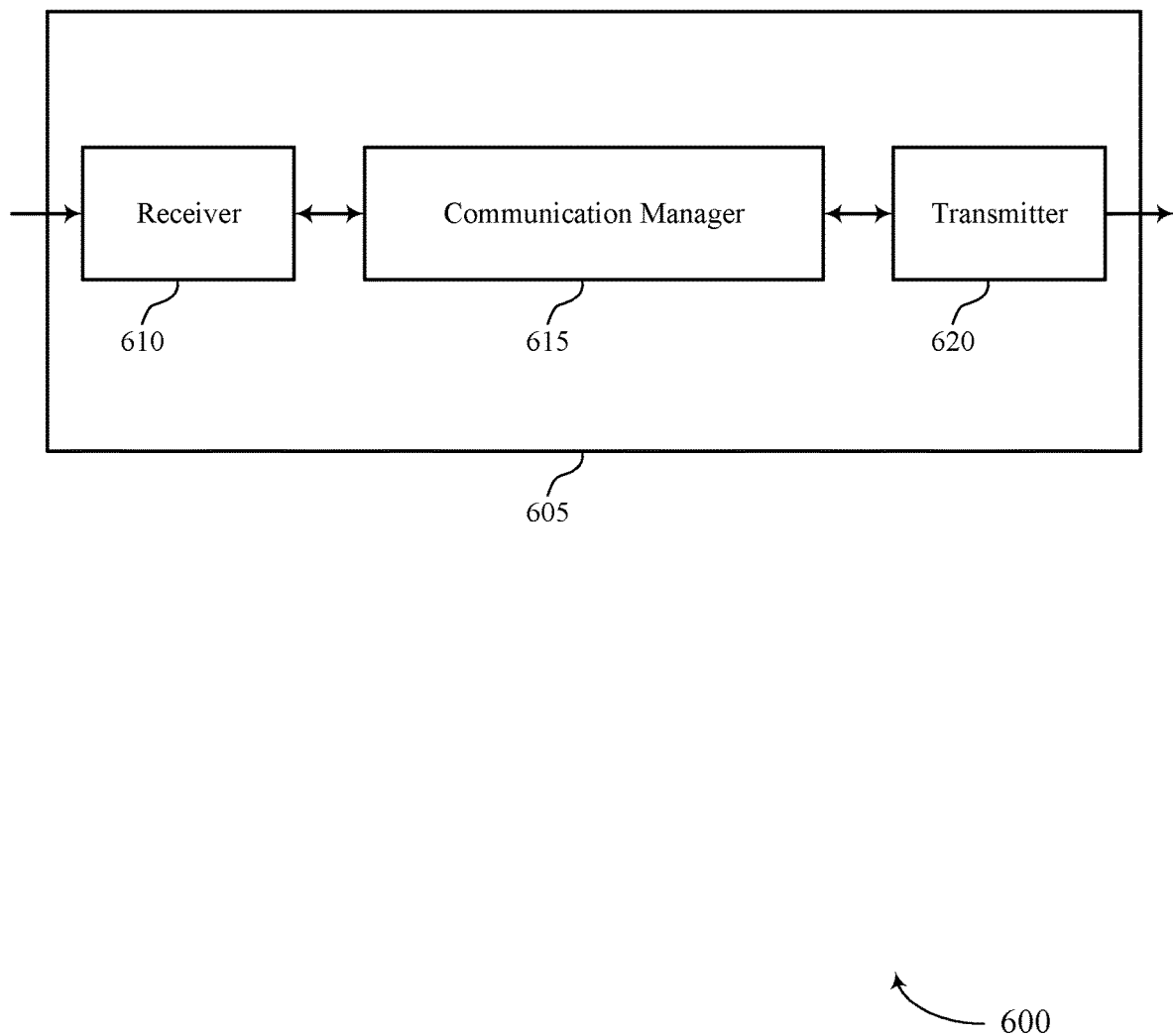
FIGS. 6 and 7 show block diagrams of devices that support techniques to allocate receive resources in accordance with aspects of the present disclosure.

FIG. 6 shows a block diagram 600 of a device 605 that supports techniques to allocate receive resources in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques to allocate receive resources, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may transmit, to a base station, a UE capability message associated with a number of downlink MIMO layers supported at the UE, receive, from the base station, a configuration for a set of downlink MIMO layers based on the UE capability message, the configuration including at least a first subset of the number of downlink MIMO layers configured for a first cell and a second subset of the number of downlink MIMO layers configured for a second cell, allocate a first set of resources to the first cell or the second cell, or both, based on the first subset and the second subset of the number of downlink MIMO layers, determine a second set of resources are unallocated to the set of downlink MIMO layers, and allocate, based on a determination that the second set of resources are unallocated, the second set of resources to the first cell or the second cell, or any combination thereof. The communication manager 615 may be an example of aspects of the communication manager 910 described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a fully programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 615 as described herein may be implemented to realize one or more potential advantages. One implementation may allow a UE 115 to improve data throughput by using available resources which otherwise may not be used. Allocating the unused resources may improve processing speed at the UE 115 or increase a data throughput for one or more cells.

The transmitter 620 may transmit signals generated by other components of the device 605. In some examples, the transmitter 620 may be collocated with a receiver 610 in a transceiver component. For example, the transmitter 620 may be an example of aspects of the transceiver 915 described with reference to FIG. 9. The transmitter 620 may utilize a single antenna or a set of antennas.

Figure 7:
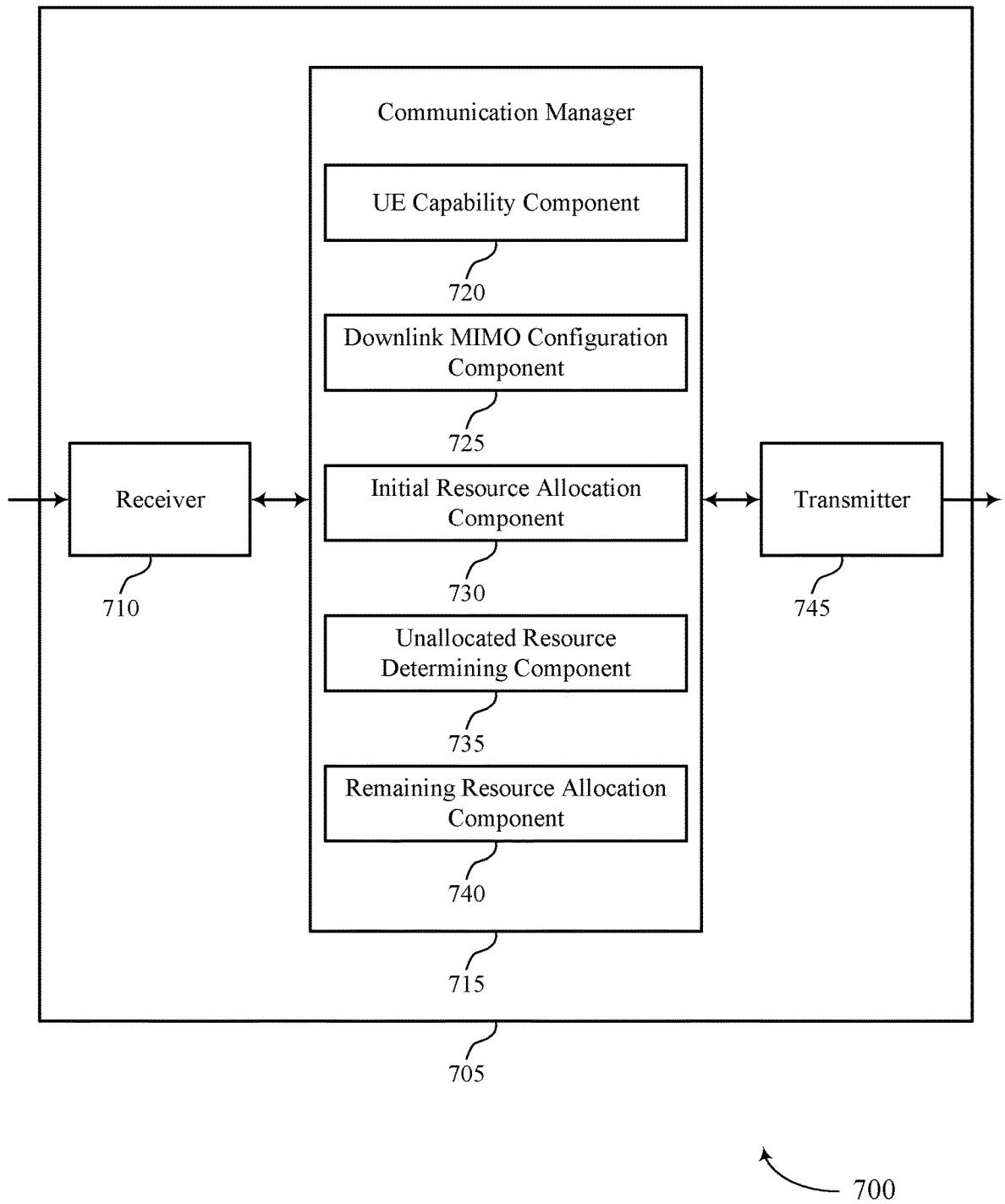

FIG. 7 shows a block diagram 700 of a device 705 that supports techniques to allocate receive resources in accordance with aspects of the present disclosure. The device 705 may be an example of aspects of a device 605, or a UE 115 as described herein. The device 705 may include a receiver 710, a communication manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to techniques to allocate receive resources, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include an UE capability component 720, a downlink MIMO configuration component 725, an initial resource allocation component 730, an unallocated resource determining component 735, and a remaining resource allocation component 740. The communication manager 715 may be an example of aspects of the communication manager 910 described herein.

The UE capability component 720 may transmit, to a base station, a UE capability message associated with a number of downlink MIMO layers supported at the UE. The downlink MIMO configuration component 725 may receive, from the base station, a configuration for a set of downlink MIMO layers based on the UE capability message, the configuration including at least a first subset of the number of downlink MIMO layers configured for a first cell and a second subset of the number of downlink MIMO layers configured for a second cell. The initial resource allocation component 730 may allocate a first set of resources to the first cell or the second cell, or both, based on the first subset and the second subset of the number of downlink MIMO layers. The unallocated resource determining component 735 may determine a second set of resources are unallocated to the set of downlink MIMO layers. The remaining resource allocation component 740 may allocate, based on a determination that the second set of resources are unallocated, the second set of resources to the first cell or the second cell, or any combination thereof.

The transmitter 745 may transmit signals generated by other components of the device 705. In some examples, the transmitter 745 may be collocated with a receiver 710 in a transceiver component. For example, the transmitter 745 may be an example of aspects of the transceiver 915 described with reference to FIG. 9. The transmitter 745 may utilize a single antenna or a set of antennas.

Figure 8:
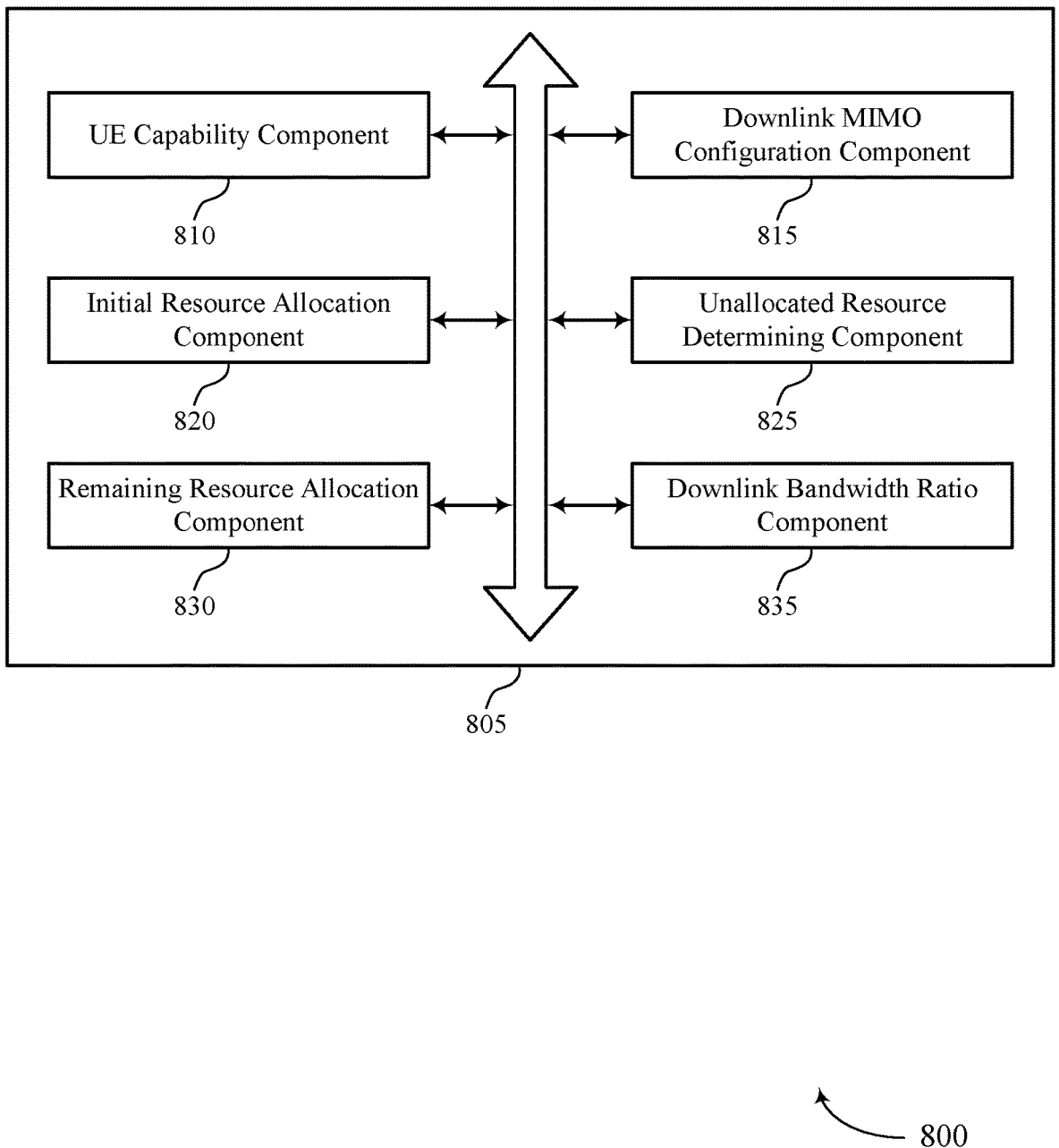
FIG. 8 shows a block diagram of a communication manager that supports techniques to allocate receive resources in accordance with aspects of the present disclosure.

FIG. 8 shows a block diagram 800 of a communication manager 805 that supports techniques to allocate receive resources in accordance with aspects of the present disclosure. The communication manager 805 may be an example of aspects of a communication manager 615, a communication manager 715, or a communication manager 910 described herein. The communication manager 805 may include an UE capability component 810, a downlink MIMO configuration component 815, an initial resource allocation component 820, an unallocated resource determining component 825, a remaining resource allocation component 830, and a downlink bandwidth ratio component 835. Each of these modules or components may communicate, directly or indirectly, with one another (e.g., via one or more buses).

The UE capability component 810 may transmit, to a base station, a UE capability message associated with a number of downlink MIMO layers supported at the UE. The downlink MIMO configuration component 815 may receive, from the base station, a configuration for a set of downlink MIMO layers based on the UE capability message, the configuration including at least a first subset of the number of downlink MIMO layers configured for a first cell and a second subset of the number of downlink MIMO layers configured for a second cell. The initial resource allocation component 820 may allocate a first set of resources to the first cell or the second cell, or both, based on the first subset and the second subset of the number of downlink MIMO layers.

The unallocated resource determining component 825 may determine a second set of resources are unallocated to the set of downlink MIMO layers. The remaining resource allocation component 830 may allocate, based on a determination that the second set of resources are unallocated, the second set of resources to the first cell or the second cell, or any combination thereof. In some examples, the remaining resource allocation component 830 may allocate the second set of resources based on respective frequency bandwidths for the first cell and the second cell, respective downlink bandwidth ratios for the first cell and the second cell, or respective numbers of resources allocated to the first cell and the second cell, or any combination thereof.

The downlink bandwidth ratio component 835 may determine a first downlink bandwidth ratio for the first cell and a second downlink bandwidth ratio for the second cell, where the second set of resources are allocated based on the first downlink bandwidth ratio and the second downlink bandwidth ratio. In some examples, the downlink bandwidth ratio component 835 may receive, from the base station, an indication of the frame configuration for the first cell.

Figure 9:
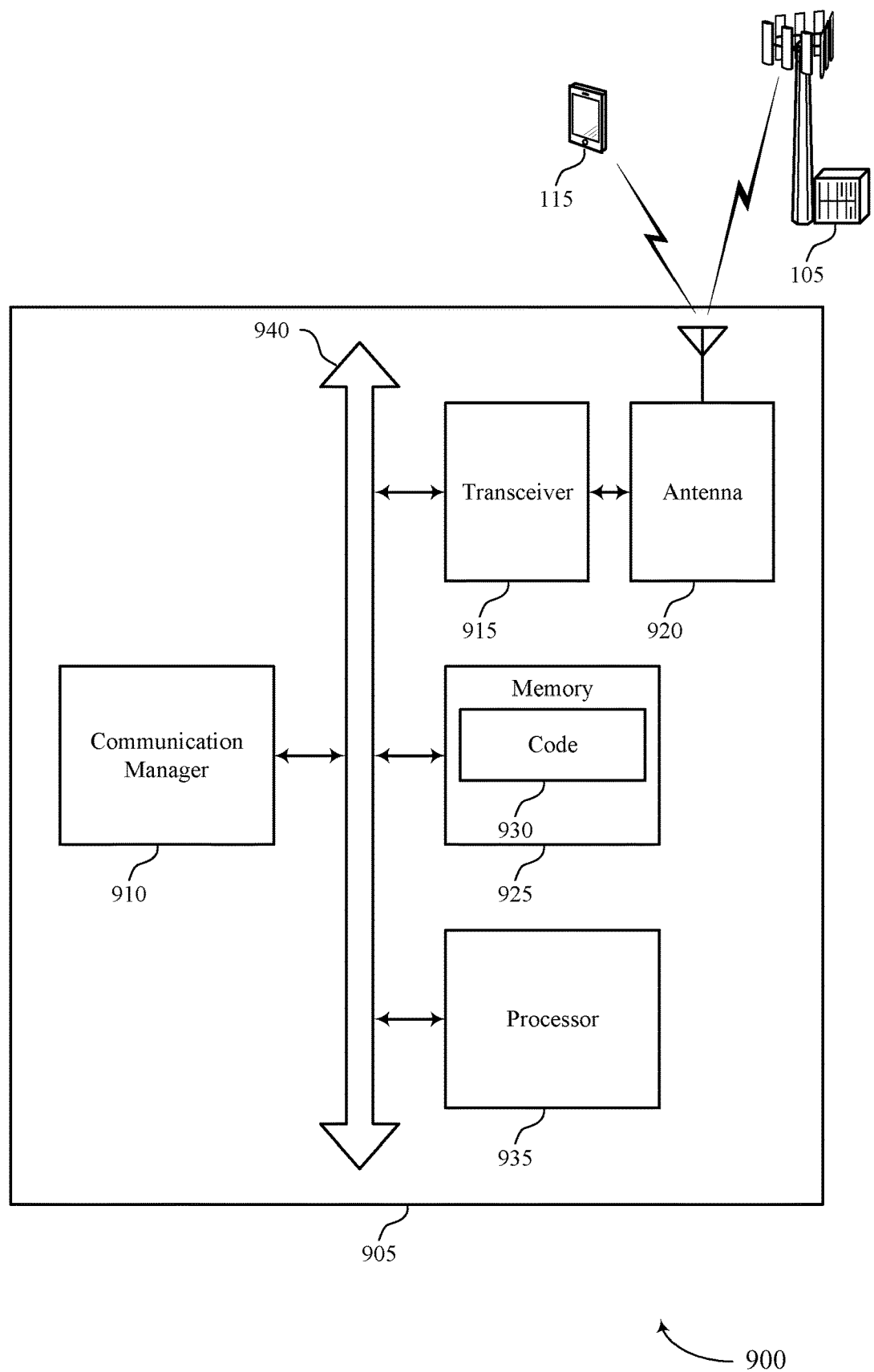
FIG. 9 shows a diagram of a system including a device that supports techniques to allocate receive resources in accordance with aspects of the present disclosure.

FIG. 9 shows a diagram of a system 900 including a device 905 that supports techniques to allocate receive resources in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may transmit, to a base station, a UE capability message associated with a number of downlink MIMO layers supported at the UE, receive, from the base station, a configuration for a set of downlink MIMO layers based on the UE capability message, the configuration including at least a first subset of the number of downlink MIMO layers configured for a first cell and a second subset of the number of downlink MIMO layers configured for a second cell, allocate a first set of resources to the first cell or the second cell, or both, based on the first subset and the second subset of the number of downlink MIMO layers, determine a second set of resources are unallocated to the set of downlink MIMO layers, and allocate, based on a determination that the second set of resources are unallocated, the second set of resources to the first cell or the second cell, or any combination thereof.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting techniques to allocate receive resources).

Figure 10:
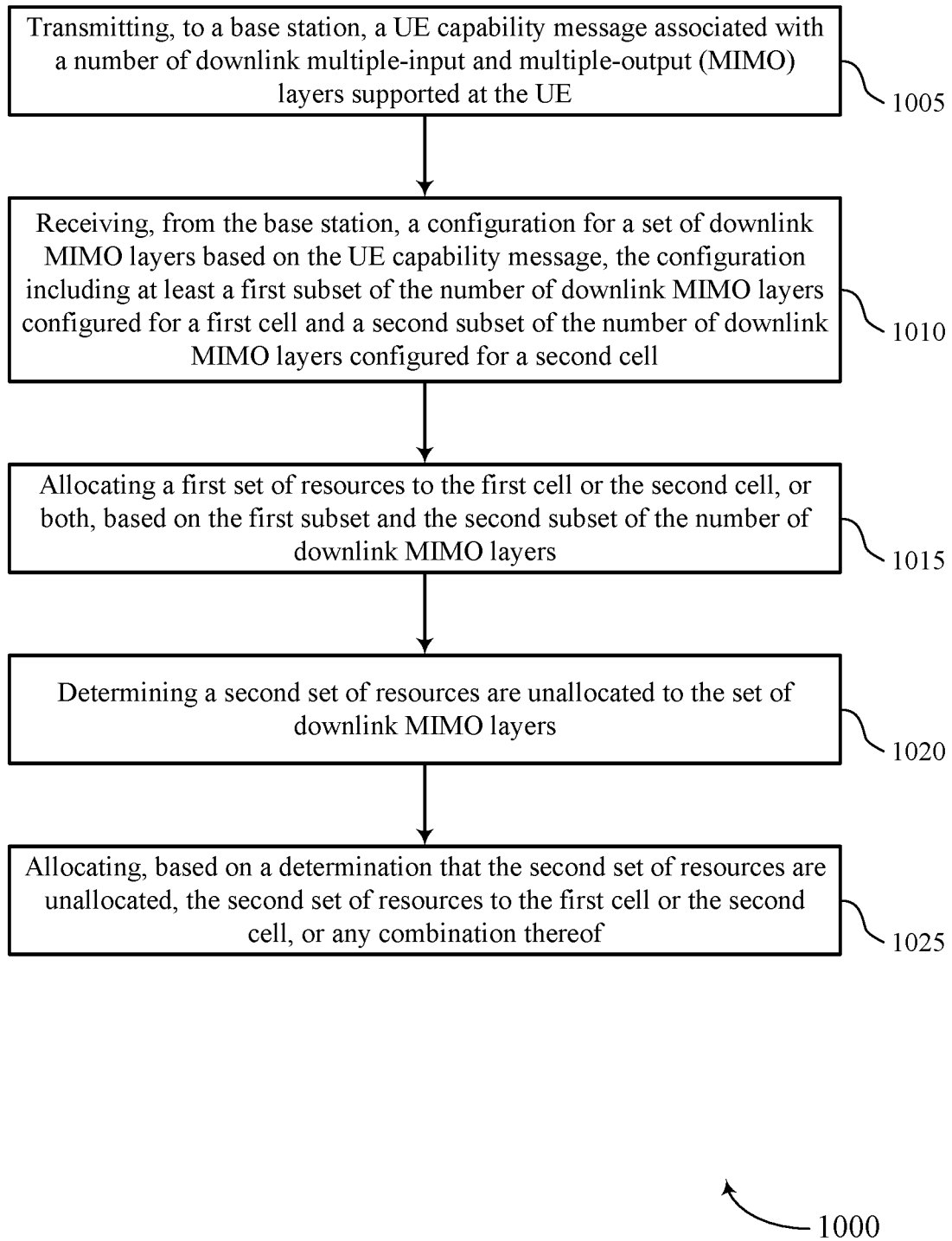
FIGS. 10 through 12 show flowcharts illustrating methods that support techniques to allocate receive resources in accordance with aspects of the present disclosure.

FIG. 10 shows a flowchart illustrating a method 1000 that supports techniques to allocate receive resources in accordance with aspects of the present disclosure. The operations of method 1000 may be implemented by a UE 115 or its components as described herein. For example, the operations of method 1000 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1005, the UE may transmit, to a base station, a UE capability message associated with a number of downlink MIMO layers supported at the UE. The operations of 1005 may be performed according to the methods described herein. In some examples, aspects of the operations of 1005 may be performed by an UE capability component as described with reference to FIGS. 6 through 9.

At 1010, the UE may receive, from the base station, a configuration for a set of downlink MIMO layers based on the UE capability message, the configuration including at least a first subset of the number of downlink MIMO layers configured for a first cell and a second subset of the number of downlink MIMO layers configured for a second cell. The operations of 1010 may be performed according to the methods described herein. In some examples, aspects of the operations of 1010 may be performed by a downlink MIMO configuration component as described with reference to FIGS. 6 through 9.

At 1015, the UE may allocate a first set of resources to the first cell or the second cell, or both, based on the first subset and the second subset of the number of downlink MIMO layers. The operations of 1015 may be performed according to the methods described herein. In some examples, aspects of the operations of 1015 may be performed by an initial resource allocation component as described with reference to FIGS. 6 through 9.

At 1020, the UE may determine a second set of resources are unallocated to the set of downlink MIMO layers. The operations of 1020 may be performed according to the methods described herein. In some examples, aspects of the operations of 1020 may be performed by an unallocated resource determining component as described with reference to FIGS. 6 through 9.

At 1025, the UE may allocate, based on a determination that the second set of resources are unallocated, the second set of resources to the first cell or the second cell, or any combination thereof. The operations of 1025 may be performed according to the methods described herein. In some examples, aspects of the operations of 1025 may be performed by a remaining resource allocation component as described with reference to FIGS. 6 through 9.

Figure 11:
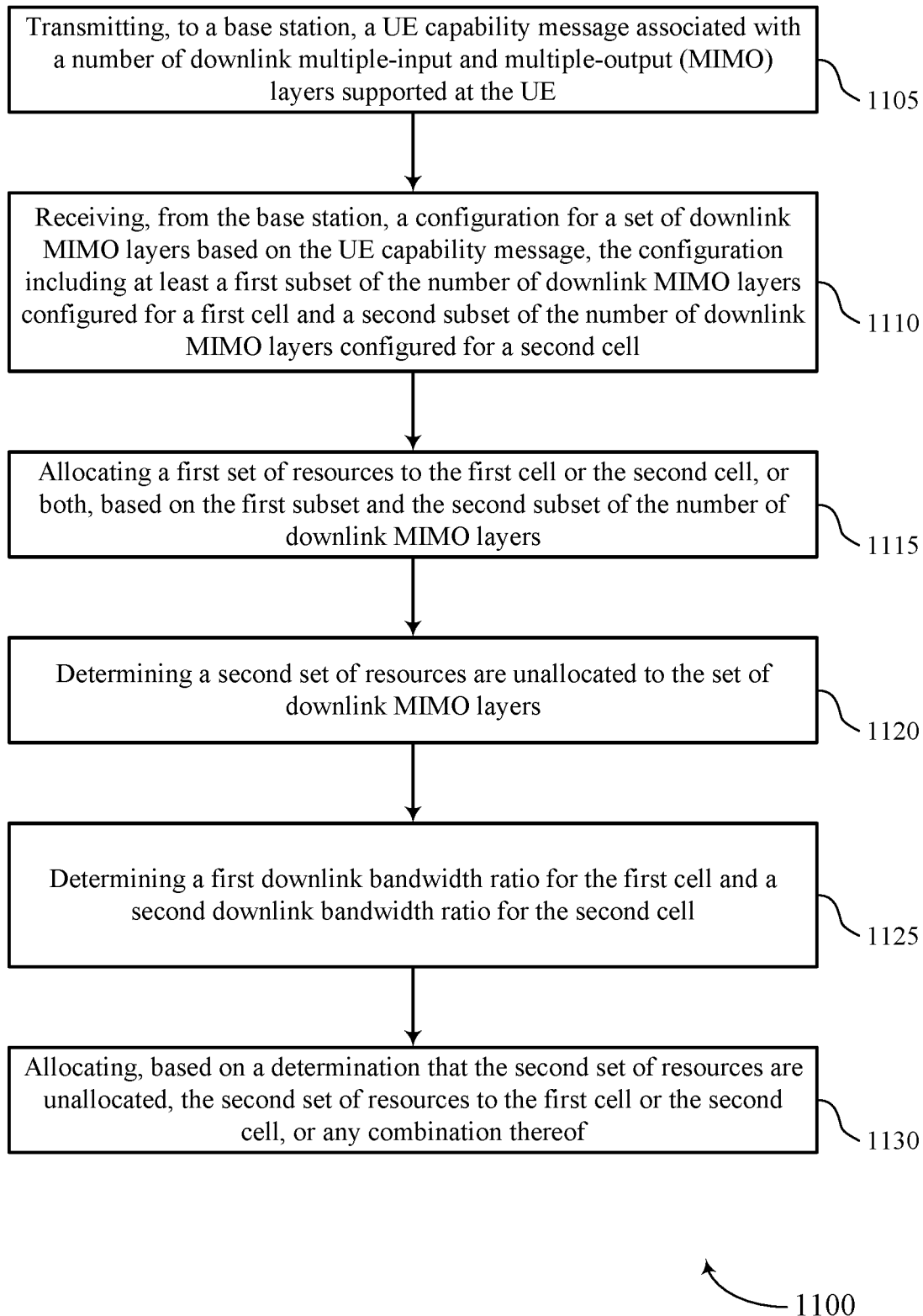

FIG. 11 shows a flowchart illustrating a method 1100 that supports techniques to allocate receive resources in accordance with aspects of the present disclosure. The operations of method 1100 may be implemented by a UE 115 or its components as described herein. For example, the operations of method 1100 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1105, the UE may transmit, to a base station, a UE capability message associated with a number of downlink MIMO layers supported at the UE. The operations of 1105 may be performed according to the methods described herein. In some examples, aspects of the operations of 1105 may be performed by an UE capability component as described with reference to FIGS. 6 through 9.

At 1110, the UE may receive, from the base station, a configuration for a set of downlink MIMO layers based on the UE capability message, the configuration including at least a first subset of the number of downlink MIMO layers configured for a first cell and a second subset of the number of downlink MIMO layers configured for a second cell. The operations of 1110 may be performed according to the methods described herein. In some examples, aspects of the operations of 1110 may be performed by a downlink MIMO configuration component as described with reference to FIGS. 6 through 9.

At 1115, the UE may allocate a first set of resources to the first cell or the second cell, or both, based on the first subset and the second subset of the number of downlink MIMO layers. The operations of 1115 may be performed according to the methods described herein. In some examples, aspects of the operations of 1115 may be performed by an initial resource allocation component as described with reference to FIGS. 6 through 9.

At 1120, the UE may determine a second set of resources are unallocated to the set of downlink MIMO layers. The operations of 1120 may be performed according to the methods described herein. In some examples, aspects of the operations of 1120 may be performed by an unallocated resource determining component as described with reference to FIGS. 6 through 9.

At 1125, the UE may determine a first downlink bandwidth ratio for the first cell and a second downlink bandwidth ratio for the second cell. The operations of 1125 may be performed according to the methods described herein. In some examples, aspects of the operations of 1125 may be performed by a downlink bandwidth ratio component as described with reference to FIGS. 6 through 9.

At 1130, the UE may allocate, based on a determination that the second set of resources are unallocated, the second set of resources to the first cell or the second cell, or any combination thereof. In some cases, the second set of resources are allocated based on the first downlink bandwidth ratio and the second downlink bandwidth ratio The operations of 1130 may be performed according to the methods described herein. In some examples, aspects of the operations of 1130 may be performed by a remaining resource allocation component as described with reference to FIGS. 6 through 9.

Figure 12:
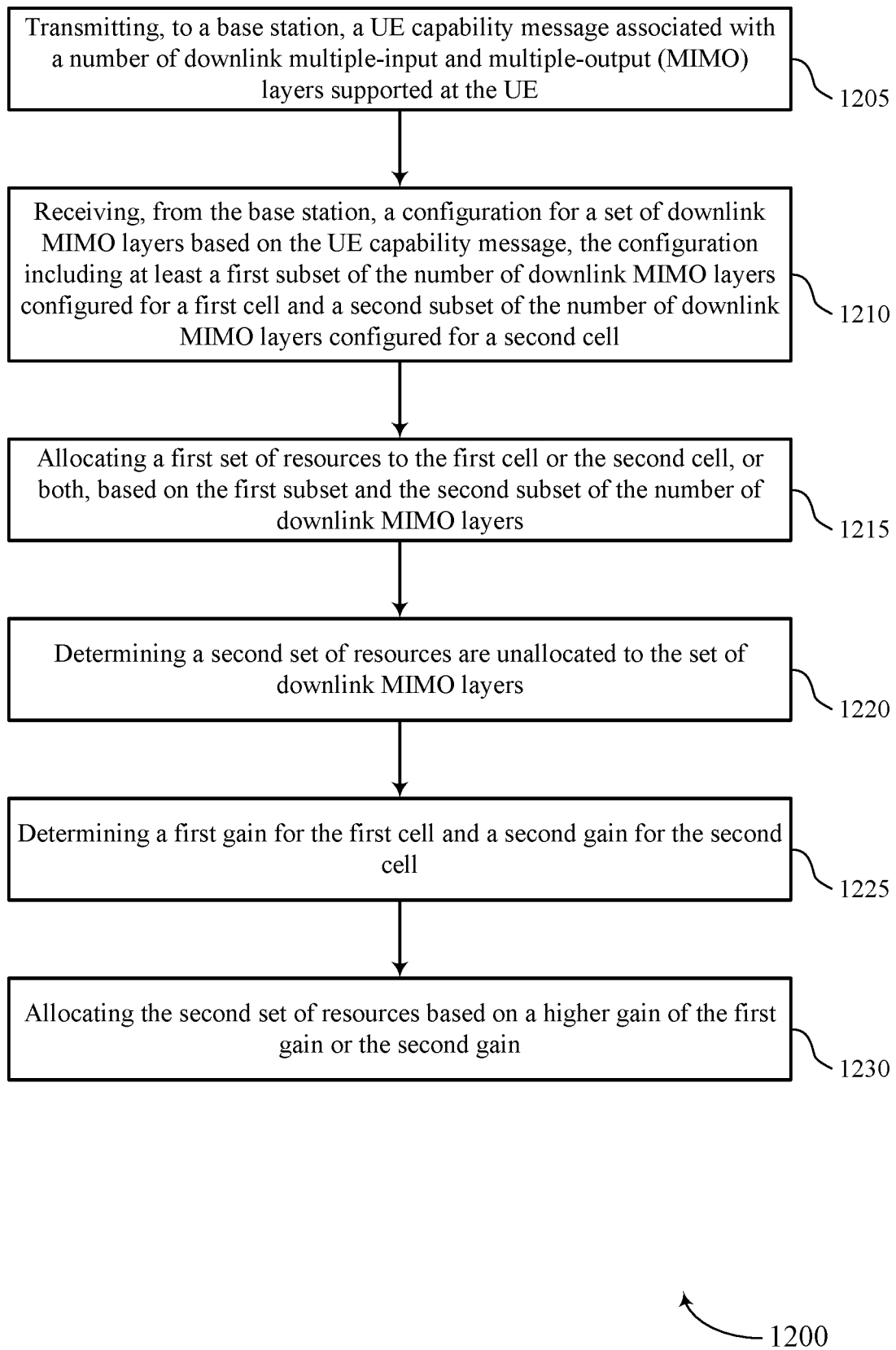

FIG. 12 shows a flowchart illustrating a method 1200 that supports techniques to allocate receive resources in accordance with aspects of the present disclosure. The operations of method 1200 may be implemented by a UE 115 or its components as described herein. For example, the operations of method 1200 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1205, the UE may transmit, to a base station, a UE capability message associated with a number of downlink MIMO layers supported at the UE. The operations of 1205 may be performed according to the methods described herein. In some examples, aspects of the operations of 1205 may be performed by an UE capability component as described with reference to FIGS. 6 through 9.

At 1210, the UE may receive, from the base station, a configuration for a set of downlink MIMO layers based on the UE capability message, the configuration including at least a first subset of the number of downlink MIMO layers configured for a first cell and a second subset of the number of downlink MIMO layers configured for a second cell. The operations of 1210 may be performed according to the methods described herein. In some examples, aspects of the operations of 1210 may be performed by a downlink MIMO configuration component as described with reference to FIGS. 6 through 9.

At 1215, the UE may allocate a first set of resources to the first cell or the second cell, or both, based on the first subset and the second subset of the number of downlink MIMO layers. The operations of 1215 may be performed according to the methods described herein. In some examples, aspects of the operations of 1215 may be performed by an initial resource allocation component as described with reference to FIGS. 6 through 9.

At 1220, the UE may determine a second set of resources are unallocated to the set of downlink MIMO layers. The operations of 1220 may be performed according to the methods described herein. In some examples, aspects of the operations of 1220 may be performed by an unallocated resource determining component as described with reference to FIGS. 6 through 9.

At 1225, the UE may determine a first gain for the first cell and a second gain for the second cell. The operations of 1225 may be performed according to the methods described herein. In some examples, aspects of the operations of 1225 may be performed by a undefined as described with reference to FIGS. 6 through 9.

At 1230, the UE may allocate the second set of resources based on a higher gain of the first gain or the second gain. The UE may allocate, based on a determination that the second set of resources are unallocated, the second set of resources to the first cell or the second cell, or any combination thereof. The operations of 1230 may be performed according to the methods described herein. In some examples, aspects of the operations of 1230 may be performed by a undefined as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: transmitting, to a base station, a UE capability message associated with a number of downlink multiple-input and multiple-output (MIMO) layers supported at the UE; receiving, from the base station, a configuration for a set of downlink MIMO layers based at least in part on the UE capability message, the configuration comprising at least a first subset of the number of downlink MIMO layers configured for a first cell and a second subset of the number of downlink MIMO layers configured for a second cell; allocating a first set of resources to the first cell or the second cell, or both, based at least in part on the first subset and the second subset of the number of downlink MIMO layers; determining a second set of resources are unallocated to the set of downlink MIMO layers; and allocating, based at least in part on a determination that the second set of resources are unallocated, the second set of resources to the first cell or the second cell, or any combination thereof.

Aspect 2: The method of aspect 1, wherein allocating the second set of resources comprises: allocating the second set of resources based at least in part on respective frequency bandwidths for the first cell and the second cell, respective downlink bandwidth ratios for the first cell and the second cell, or respective numbers of resources allocated to the first cell and the second cell, or any combination thereof.

Aspect 3: The method of any of aspects 1 through 2, further comprising: determining a first downlink bandwidth ratio for the first cell and a second downlink bandwidth ratio for the second cell, wherein the second set of resources are allocated based at least in part on the first downlink bandwidth ratio and the second downlink bandwidth ratio.

Aspect 4: The method of aspect 3, wherein the first downlink bandwidth ratio and the second downlink bandwidth ratio are based at least in part on whether the first cell and the second cell are configured for frequency division duplexing or time division duplexing.

Aspect 5: The method of any of aspects 3 through 4, wherein the first downlink bandwidth ratio is determined based at least in part on a frame configuration for the first cell, the first cell is configured for time division duplexing.

Aspect 6: The method of aspect 5, further comprising: receiving, from the base station, an indication of the frame configuration for the first cell.

Aspect 7: The method of any of aspects 5 through 6, wherein the first downlink bandwidth ratio is determined based at least in part on a special subframe configuration for the first cell.

Aspect 8: The method of any of aspects 3 through 7, wherein the second downlink bandwidth ratio is determined based at least in part on a number of downlink symbols per downlink slot and a number of downlink slots per uplink-downlink periodicity for the second cell, the second cell is configured for time division duplexing.

Aspect 9: The method of aspect 8, further comprising: receiving, from the base station, an indication of the number of downlink symbols per downlink slot and the number of downlink slots per uplink-downlink periodicity for the second cell.

Aspect 10: The method of any of aspects 1 through 9, further comprising: determining a first gain for the first cell and a second gain for the second cell; and allocating the second set of resources based at least in part on a higher gain of the first gain or the second gain.

Aspect 11: The method of aspect 10, wherein the first gain is based at least in part on a first downlink bandwidth of the first cell and a first downlink bandwidth ratio of the first cell, and the second gain is based at least in part on a second downlink bandwidth of the second cell and a second downlink bandwidth ratio of the second cell.

Aspect 12: The method of any of aspects 1 through 11, further comprising: determining a first reference signal measurement for the first cell and a second reference signal measurement for the second cell, wherein allocating the second set of resources is based at least in part on the first reference signal measurement and the second reference signal measurement.

Aspect 13: The method of aspect 12, wherein the first reference signal measurement and the second reference signal measurement are based at least in part on respective reference signal received power measurements, reference signal received quality measurements, or both.

Aspect 14: The method of any of aspects 1 through 13, wherein the first cell is a New Radio cell of a dual connectivity configuration, and the second cell is a Long Term Evolution cell of the dual connectivity configuration.

Aspect 15: The method of any of aspects 1 through 14, further comprising: determining a first efficiency value based at least in part on allocating the second set of resources to the first cell; determining a second efficiency value based at least in part on allocating the second set of resources to the second cell; and comparing the first efficiency value to the second efficiency value, wherein the second set of resources are allocated based at least in part on the comparing.

Aspect 16: The method of aspect 15, further comprising: applying a monotonically increasing function to the first efficiency value and the second efficiency value, wherein the comparing is based at least in part on applying the monotonically increasing function.

Aspect 17: The method of any of aspects 1 through 16, further comprising: receiving a request from the base station to transmit the UE capability message associated with the number of downlink MIMO layers supported at the UE, wherein the UE capability message is transmitted based at least in part on receiving the request.

Aspect 18: The method of any of aspects 1 through 17, further comprising: determining a maximum number of resources, wherein the maximum number of resources corresponds to the first set of resources and the second set of resources.

Aspect 19: An apparatus for wireless communications at a UE, comprising a processor; memory coupled with the processor; and instructions stored in the memory and executable by the processor to cause the apparatus to perform a method of any of aspects 1 through 18.

Aspect 20: An apparatus for wireless communications at a UE, comprising at least one means for performing a method of any of aspects 1 through 18.

Aspect 21: A non-transitory computer-readable medium storing code for wireless communications at a UE, the code comprising instructions executable by a processor to perform a method of any of aspects 1 through 18.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting, to a base station, a UE capability message associated with a number of downlink multiple-input and multiple-output (MIMO) layers supported at the UE;
    receiving, from the base station, a configuration for a set of downlink MIMO layers based at least in part on the UE capability message, the configuration comprising at least a first subset of the number of downlink MIMO layers configured for a first cell and a second subset of the number of downlink MIMO layers configured for a second cell;
    allocating a first set of resources to the first cell or the second cell, or both, based at least in part on the first subset and the second subset of the number of downlink MIMO layers;
    determining a second set of resources are unallocated to the set of downlink MIMO layers; and
    allocating, based at least in part on a determination that the second set of resources are unallocated, the second set of resources to the first cell or the second cell, or any combination thereof.

2. The method of claim 1, wherein allocating the second set of resources comprises:
    allocating the second set of resources based at least in part on respective frequency bandwidths for the first cell and the second cell, respective downlink bandwidth ratios for the first cell and the second cell, or respective numbers of resources allocated to the first cell and the second cell, or any combination thereof.

3. The method of claim 1, further comprising:
    determining a first downlink bandwidth ratio for the first cell and a second downlink bandwidth ratio for the second cell, wherein the second set of resources are allocated based at least in part on the first downlink bandwidth ratio and the second downlink bandwidth ratio.

4. The method of claim 3, wherein the first downlink bandwidth ratio and the second downlink bandwidth ratio are based at least in part on whether the first cell and the second cell are configured for frequency division duplexing or time division duplexing.

5. The method of claim 3, wherein the first downlink bandwidth ratio is determined based at least in part on a frame configuration for the first cell, wherein the first cell is configured for time division duplexing.

6. The method of claim 5, further comprising:
    receiving, from the base station, an indication of the frame configuration for the first cell.

7. The method of claim 5, wherein the first downlink bandwidth ratio is determined based at least in part on a special subframe configuration for the first cell.

8. The method of claim 3, wherein the second downlink bandwidth ratio is determined based at least in part on a number of downlink symbols per downlink slot and a number of downlink slots per uplink-downlink periodicity for the second cell, wherein the second cell is configured for time division duplexing.

9. The method of claim 8, further comprising:

receiving, from the base station, an indication of the number of downlink symbols per downlink slot and the number of downlink slots per uplink-downlink periodicity for the second cell.

10. The method of claim 1, further comprising:

determining a first gain for the first cell and a second gain for the second cell; and allocating the second set of resources based at least in part on a higher gain of the first gain or the second gain.

11. The method of claim 10, wherein the first gain is based at least in part on a first downlink bandwidth of the first cell and a first downlink bandwidth ratio of the first cell, and the second gain is based at least in part on a second downlink bandwidth of the second cell and a second downlink bandwidth ratio of the second cell.

12. The method of claim 1, further comprising:

determining a first reference signal measurement for the first cell and a second reference signal measurement for the second cell, wherein allocating the second set of resources is based at least in part on the first reference signal measurement and the second reference signal measurement.

13. The method of claim 12, wherein the first reference signal measurement and the second reference signal measurement are based at least in part on respective reference signal received power measurements, reference signal received quality measurements, or both.

14. The method of claim 1, wherein the first cell is a New Radio cell of a dual connectivity configuration, and the second cell is a Long Term Evolution cell of the dual connectivity configuration.

15. The method of claim 1, further comprising:

determining a first efficiency value based at least in part on allocating the second set of resources to the first cell;

determining a second efficiency value based at least in part on allocating the second set of resources to the second cell; and comparing the first efficiency value to the second efficiency value, wherein the second set of resources are allocated based at least in part on the comparing.

16. The method of claim 15, further comprising:

applying a monotonically increasing function to the first efficiency value and the second efficiency value, wherein the comparing is based at least in part on applying the monotonically increasing function.

17. The method of claim 1, further comprising:

receiving a request from the base station to transmit the UE capability message associated with the number of downlink MIMO layers supported at the UE, wherein the UE capability message is transmitted based at least in part on receiving the request.

18. The method of claim 1, further comprising:

determining a maximum number of resources, wherein the maximum number of resources corresponds to the first set of resources and the second set of resources.

19. An apparatus for wireless communications at a user equipment (UE), comprising:

a processor, memory in electronic communication with the processor, and instructions stored in the memory and executable by the processor to cause the apparatus to:

transmit, to a base station, a UE capability message associated with a number of downlink multiple-input and multiple-output (MIMO) layers supported at the UE;

receive, from the base station, a configuration for a set of downlink MIMO layers based at least in part on the UE capability message, the configuration comprising at least a first subset of the number of downlink MIMO layers configured for a first cell and a second subset of the number of downlink MIMO layers configured for a second cell;

allocate a first set of resources to the first cell or the second cell, or both, based at least in part on the first subset and the second subset of the number of downlink MIMO layers;

determine a second set of resources are unallocated to the set of downlink MIMO layers; and allocate, based at least in part on a determination that the second set of resources are unallocated, the second set of resources to the first cell or the second cell, or any combination thereof.

20. The apparatus of claim 19, wherein the instructions to allocate the second set of resources are executable by the processor to cause the apparatus to:

allocate the second set of resources based at least in part on respective frequency bandwidths for the first cell and the second cell, respective downlink bandwidth ratios for the first cell and the second cell, or respective numbers of resources allocated to the first cell and the second cell, or any combination thereof.

21. The apparatus of claim 19, wherein the instructions are further executable by the processor to cause the apparatus to:

determine a first downlink bandwidth ratio for the first cell and a second downlink bandwidth ratio for the second cell, wherein the second set of resources are allocated based at least in part on the first downlink bandwidth ratio and the second downlink bandwidth ratio.

22. The apparatus of claim 21, wherein the first downlink bandwidth ratio and the second downlink bandwidth ratio are based at least in part on whether the first cell and the second cell are configured for frequency division duplexing or time division duplexing.

23. The apparatus of claim 21, wherein the first downlink bandwidth ratio is determined based at least in part on a frame configuration for the first cell, wherein the first cell is configured for time division duplexing.

24. The apparatus of claim 23, wherein the instructions are further executable by the processor to cause the apparatus to:

receive, from the base station, an indication of the frame configuration for the first cell.

25. The apparatus of claim 21, wherein the second downlink bandwidth ratio is determined based at least in part on a number of downlink symbols per downlink slot and a number of downlink slots per uplink-downlink periodicity for the second cell, wherein the second cell is configured for time division duplexing.

26. The apparatus of claim 19, wherein the instructions are further executable by the processor to cause the apparatus to:
- determine a first gain for the first cell and a second gain for the second cell; and
- allocate the second set of resources based at least in part on a higher gain of the first gain or the second gain.

27. The apparatus of claim 26, wherein the first gain is based at least in part on a first downlink bandwidth of the first cell and a first downlink bandwidth ratio of the first cell, and the second gain is based at least in part on a second downlink bandwidth of the second cell and a second downlink bandwidth ratio of the second cell.

28. The apparatus of claim 19, wherein the instructions are further executable by the processor to cause the apparatus to:
- determine a first efficiency value based at least in part on allocating the second set of resources to the first cell;
- determine a second efficiency value based at least in part on allocating the second set of resources to the second cell; and
- compare the first efficiency value to the second efficiency value, wherein the second set of resources are allocated based at least in part on the comparing.

29. An apparatus for wireless communications at a user equipment (UE), comprising:
- means for transmitting, to a base station, a UE capability message associated with a number of downlink multiple-input and multiple-output (MIMO) layers supported at the UE;
- means for receiving, from the base station, a configuration for a set of downlink MIMO layers based at least in part on the UE capability message, the configuration comprising at least a first subset of the number of downlink MIMO layers configured for a first cell and a second subset of the number of downlink MIMO layers configured for a second cell;
- means for allocating a first set of resources to the first cell or the second cell, or both, based at least in part on the first subset and the second subset of the number of downlink MIMO layers;
- means for determining a second set of resources are unallocated to the set of downlink MIMO layers; and
- means for allocating, based at least in part on a determination that the second set of resources are unallocated, the second set of resources to the first cell or the second cell, or any combination thereof.

30. A non-transitory computer-readable medium storing code for wireless communications at a user equipment (UE), the code comprising instructions executable by a processor to:
- transmit, to a base station, a UE capability message associated with a number of downlink multiple-input and multiple-output (MIMO) layers supported at the UE;
- receive, from the base station, a configuration for a set of downlink MIMO layers based at least in part on the UE capability message, the configuration comprising at least a first subset of the number of downlink MIMO layers configured for a first cell and a second subset of the number of downlink MIMO layers configured for a second cell;
- allocate a first set of resources to the first cell or the second cell, or both, based at least in part on the first subset and the second subset of the number of downlink MIMO layers;
- determine a second set of resources are unallocated to the set of downlink MIMO layers; and
- allocate, based at least in part on a determination that the second set of resources are unallocated, the second set of resources to the first cell or the second cell, or any combination thereof.

\* \* \* \* \*